H. LENO.
CAR LIFTING DEVICE.
APPLICATION FILED JULY 29, 1920.
1,409,456.
Patented Mar. 14, 1922.
2 SHEETS—SHEET 1.
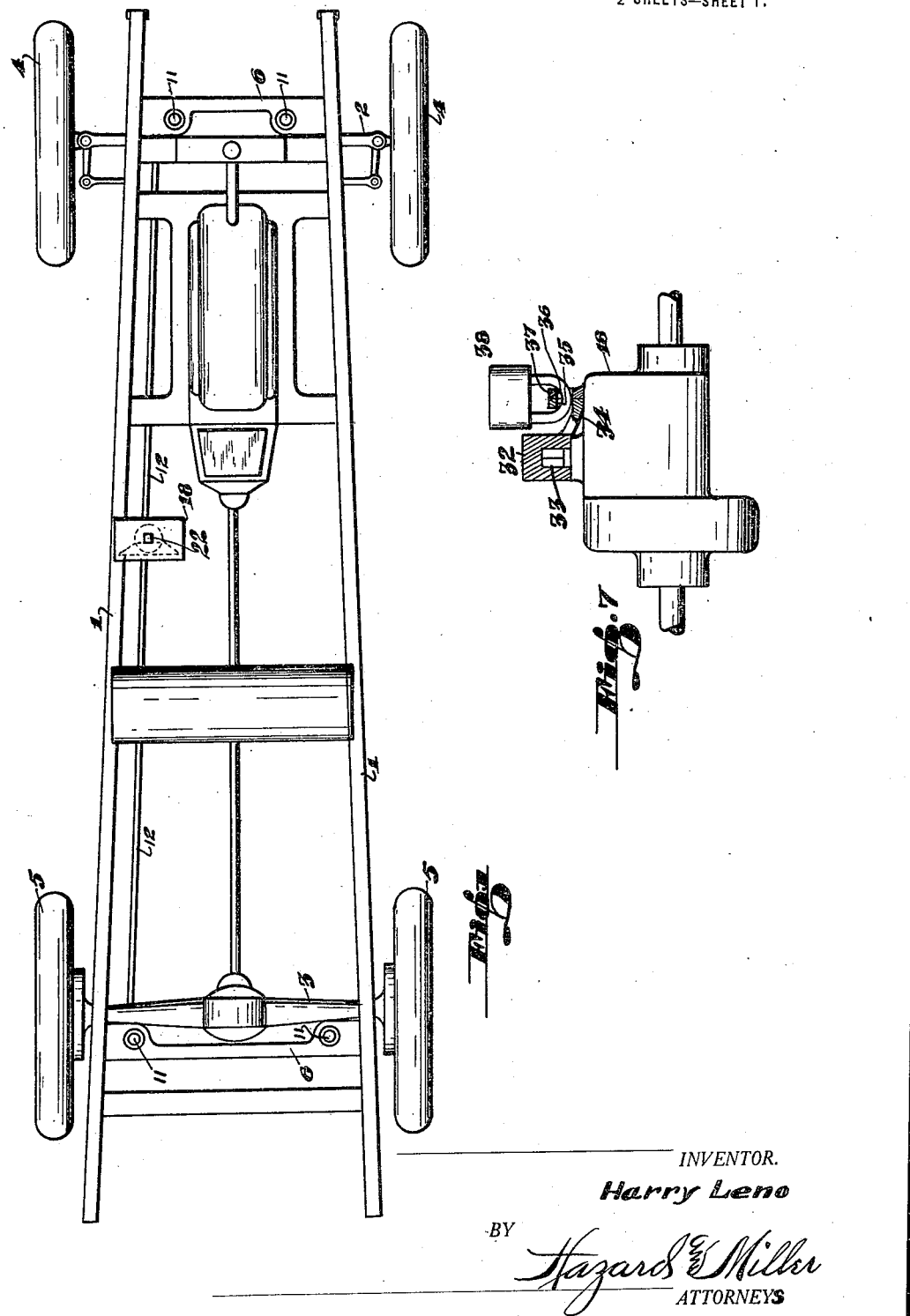
INVENTOR.
Harry Leno
BY
Hazard & Miller
ATTORNEYS

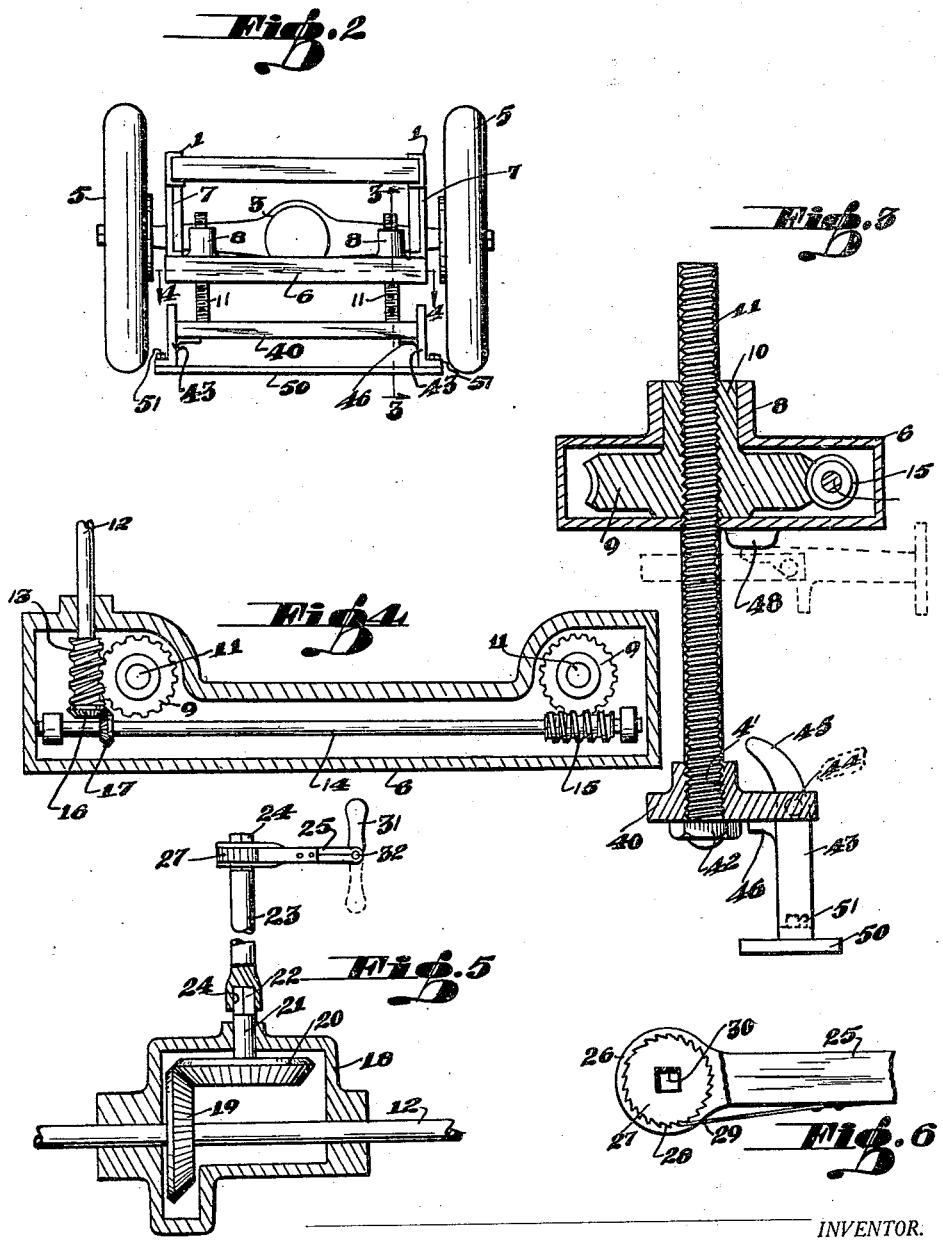

UNITED STATES PATENT OFFICE.

HARRY LENO, OF LOS ANGELES, CALIFORNIA.

CAR-LIFTING DEVICE.

1,409,456. Specification of Letters Patent. Patented Mar. 14, 1922.

Application filed July 29, 1920. Serial No. 399,835.

*To all whom it may concern:*

Be it known that I, HARRY LENO, a subject of the King of Great Britain, residing at Los Angeles, in the county of Los Angeles and State of California, have invented new and useful Improvements in Car-Lifting Devices, of which the following is a specification:

This invention is a lifting device for motor vehicles and the like, and has for its object the provision of a construction attached to a motor vehicle, preferably, adjacent both the front and rear wheels thereof and adapted to be moved into engagement with the ground for elevating the motor vehicle.

The invention will be readily understood from the following description of the accompanying drawings, in which—

Figure 1 is a plan view of the frame and running gear of a motor vehicle having the improved lifting device applied thereto.

Fig. 2 is an end elevation of the motor vehicle frame showing the lifting device.

Fig. 3 is an enlarged longitudinal section on the line 3—3 of Fig. 2.

Fig. 4 is a horizontal section on the line 4—4 of Fig. 2.

Fig. 5 is a side elevation of the actuating mechanism for the device showing its connection with the main shaft of the device in vertical section.

Fig. 6 is a detail plan view of the actuating crank.

Fig. 7 is a side elevation of the connection between the main shaft of the device and the actuating mechanism showing the method of locking the same.

In the drawings I have shown a usual automobile frame including side bars 1, front and rear axles 2 and 3, front wheels 4, and rear wheels 5.

The improved lifting mechanism consists of a jack mounted upon the automobile frame beyond front axle 2, and a similar jack mounted upon the frame beyond the rear axle 3. Each of these jacks consists of a box-like casing 6 extending transversely of the automobile frame and, preferably, supported below the side bars 1 by means of the depending brackets 7. Bearing lugs 8 project upwardly from casing 6 adjacent the respective ends thereof, and pinions 9 are journaled within casing 6 by means of axle bearings 10 projecting beyond one of the faces of said pinions and journaled in the bearing lugs 8. Screw threaded elevating rods 11 are threaded through the pinions 9 so as to project above and below pinions 9 and the casing 6.

The pinions 9 are arranged to be simultaneously rotated by means of a main actuating shaft 12 extending the length of the automobile frame and journaled in the respective casings 6. The ends of this shaft within the respective casings are provided with worm wheels 13 meshing with one of the pinions 9 in each of the casings 6. By this arrangement it will be seen that the reverse rotation of said main shaft will reversely rotate the pinions engaged thereby. A countershaft 14 extends lengthwise of casing 6 and is provided with a worm wheel 15 meshing with the second of the pinions 9 within said casing. This countershaft is rotated by main shaft 12 as by the bevel gear 16—17.

Main shaft 12 is arranged to be reversely rotated for reversely rotating pinions 9 from the driver's seat of the automobile. For this purpose a gear box 18 is, preferably, received about main shaft 12 beneath the driver's seat, said gear box being suitably supported from the automobile frame. A bevel gear 19 is fixed upon shaft 12 within the gear box, and said bevel gear meshes with a bevel gear 20 fixed upon a stub shaft 21 journaled in a bearing provided upon the gear box and projecting upwardly therefrom. The stub shaft 21 is provided with a squared end 22 arranged to be engaged by an actuating crank. The actuating crank consists of an upright shaft 23 having a squared socket 24 at its lower end arranged to be removably received over the squared end 22 of shaft 21. The upper end of shaft 23 is, preferably, provided with a squared end 24. A ratchet handle 25 is adapted to be reversely positioned upon the squared end 24 of shaft 23 in order to provide reverse ratchet actuating means for shaft 23. The handle 25 is shown as provided with a yoke bearing head 26 in which is journaled the ratchet wheel 27.

The ratchet teeth 28 are adapted to be engaged by the spring pawl 29 fixed to the handle 25 so as to permit free turning of handle 25 relative to wheel 27 in one direction while causing turning of the ratchet wheel with the handle in the opposite direction. The ratchet wheel is provided with a squared axle bearing 30 fitting over the squared end 24 of shaft 23. A handle 31 is pivoted at 32 to the free end of the actuating handle 25 so that it may be swung to a position at right angles to handle 25 at either side thereof. The ratchet handle 25, by this arrangement, is readily removable from shaft 23, and when it is desired to reverse the direction of ratchet engagement between said handle and shaft, it is only necessary to remove the ratchet handle and reversely position the same upon shaft 23 with the handle 31 swung to the opposite side of the handle 25.

Means are, preferably, provided for locking the mechanism in operative position as by removing shaft 23 from stub shaft 21 and placing a cap 32 over said stub shaft and locking said cap in position. As an instance of this arrangement the cap may be provided with a squared socket 33 arranged to engage the squared end of shaft 21 so as to hold the latter against rotation. The cap 32 is locked against removal and against rotation by providing the latter with an outwardly projecting lug 34 having a slot 35 arranged to aline with a slot 36 provided in a bracket 37 projecting from the gear box 18. Any suitable lock shown as a usual padlock 38 is arranged to be inserted through the alined slots 35—36 for locking the cap 32 to the bracket 37.

The threaded rods 11 are held against rotation relative to the reversely rotatable pinions 9 so that said reverse rotation of the pinions will raise and lower said rods through the threaded connection provided between the latter and the pinions. The means employed for holding the rods 11 of a casing 6 against rotation may consist of an arm 40 extending from one rod to the other and fixed to said rods by threaded engagements 4'. Nuts 42 are threaded upon the ends of the rods for retaining the latter relative to the arm 40.

Ground engaging members are carried by the arm 40 and are arranged to be automatically swung into either operative or inoperative position. The ground engaging members consist of an arm 43 pivoted by the pin 44 to the respective ends of arm 40. Each of these arms terminate beyond the pivot 44 in a curved finger 45, and below pivot 44 each of the arms is provided with a lug 46. The ground engaging arms are so weighted as to normally depend in upright position from arm 40 with the lugs 46 abutting against the arm 40. In this position, when the elevating rods 11 are lowered relative to the casing 6, the arms 43 will engage the ground so that the casing 6 will be elevated. The casings 6 being fixed relative to the automobile frame beyond the front and rear axles thereof will as a consequence cause the automobile frame to be lifted from the ground.

When main shaft 12 is rotated in the reverse direction for again elevating rods 11 relative to casings 6 and thus returning the automobile to the ground, the arms 43 thus lifted with the elevating rods will have their fingers 45 engaged by lugs 48 depending from casings 6 so that the arms 43 will be swung upwardly into substantially horizontal position as shown in dotted lines in Fig. 3. The arms 43 will thus be out of the way when the lifting mechanism is not in use.

When found desirable the arms 43 at each end of the automobile may be connected by a cross plate 50 suitably bolted to the arms as shown at 51. These plates are arranged to permit relative large flat surfaces to the ground in order that the lifting mechanism may be employed in soft or sandy ground without causing the arms 43 to sink into the ground.

The device as thus constructed forms jacking means carried by the automobile and automatically moving to operative position as soon as shaft 23 is rotated in a direction to lower the elevating rods 11. The lifting device may be employed when it is necessary to lift the wheels of an automobile from the ground in order to repair or change a tire, and the device may also be employed whenever the automobile is stopped in order to take the strain of the weight of the automobile off of the tires.

Various changes may be made without departing from the spirit of the invention as claimed.

What is claimed is:

1. The combination with a vehicle, of elevating means, ground engaging means pivoted thereto so as to swing downwardly into operative position, said ground engaging means being arranged to engage a portion of the elevating means when elevated, so as to swing said ground engaging means into inoperative position.

2. The combination with a vehicle, of ground engaging means elevating means supporting the same mounted upon said vehicle, and means for automatically moving said ground engaging elevating means into inoperative or operative position as said elevating means is reversely actuated.

In testimony whereof I have signed my name to this specification.

HARRY LENO.